United States Patent
Shigyo (10) Patent No.: US 9,409,564 B2
(45) Date of Patent: Aug. 9, 2016

(54) CONTROL DEVICE

(71) Applicant: DENSO CORPORATION, Kariya, Aichi-pref. (JP)

(72) Inventor: Masakatsu Shigyo, Handa (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/721,397

(22) Filed: May 26, 2015

(65) Prior Publication Data

US 2015/0336560 A1 Nov. 26, 2015

(30) Foreign Application Priority Data

May 26, 2014 (JP) .................................. 2014-107948

(51) Int. Cl.
| | |
|---|---|
| *B60L 11/00* | (2006.01) |
| *B60L 15/00* | (2006.01) |
| *B60W 20/00* | (2016.01) |
| *B60W 10/30* | (2006.01) |
| *B60W 10/26* | (2006.01) |
| *B60K 6/46* | (2007.10) |

(52) U.S. Cl.
CPC .............. *B60W 20/10* (2013.01); *B60K 6/46* (2013.01); *B60W 10/26* (2013.01); *B60W 10/30* (2013.01); *B60W 20/00* (2013.01); *B60W 2550/402* (2013.01); *B60W 2710/244* (2013.01); *B60W 2710/30* (2013.01); *Y10S 903/93* (2013.01)

(58) Field of Classification Search
CPC ..... B60W 20/10; B60W 20/00; B60W 10/30; B60W 10/26; B60W 2710/30; B60W 2710/244; B60W 2550/402; B60K 6/46; Y10S 903/93
See application file for complete search history.

(56) References Cited

U.S. PATENT DOCUMENTS

| | | | |
|---|---|---|---|
| 2002/0084769 A1 | 7/2002 | Iritani et al. | |
| 2009/0101421 A1 | 4/2009 | Oyobe et al. | |
| 2009/0114463 A1* | 5/2009 | DeVault ................. | B60K 6/365 180/65.29 |
| 2010/0324765 A1* | 12/2010 | Iida ...................... | H01M 10/486 701/22 |
| 2011/0202418 A1* | 8/2011 | Kempton ............ | B60L 11/1824 705/26.1 |
| 2012/0222438 A1* | 9/2012 | Osaka ................ | B60H 1/00271 62/126 |
| 2013/0020398 A1* | 1/2013 | Goto ................... | B60H 1/00285 237/12.4 |
| 2013/0211649 A1* | 8/2013 | Tashiro .............. | B60H 1/00735 701/22 |
| 2014/0012445 A1* | 1/2014 | Fleckenstein ....... | H01M 10/486 701/22 |
| 2014/0081481 A1* | 3/2014 | Nishida .............. | B60H 1/00771 701/2 |
| 2014/0144998 A1* | 5/2014 | Ichishi ............... | B60H 1/00314 237/12.3 A |
| 2014/0277869 A1* | 9/2014 | King ................... | B60H 1/00278 701/22 |

FOREIGN PATENT DOCUMENTS

JP 2004-56867 2/2004

* cited by examiner

*Primary Examiner* — Mary Cheung
(74) *Attorney, Agent, or Firm* — Nixon & Vanderhye PC

(57) ABSTRACT

A vehicle is equipped with an engine, a motor generator, an electricity storing part, and an air-conditioning part. A control device for the vehicle includes: a determining portion that determines whether the vehicle approaches a destination; an estimating portion that estimates a cooling demand or a heating demand for a next trip of the vehicle; and a changing portion that changes a target value of a charge state of the electricity storing part from a normal value to a different value when the determining portion determines that the vehicle approaches the destination and when the estimating portion estimates that there is the cooling demand or the heating demand.

8 Claims, 5 Drawing Sheets

CONTROL DEVICE

CROSS REFERENCE TO RELATED APPLICATION

This application is based on Japanese Patent Application No. 2014-107948 filed on May 26, 2014, the disclosure of which is incorporated herein by reference in its entirety.

TECHNICAL FIELD

The present disclosure relates to a control device.

BACKGROUND

Conventionally, in a hybrid vehicle equipped with an engine and a motor generator, a target value of SOC (state of charge) of a battery is set to reduce fuel consumption. JP 2004-56867A describes that the amount of charge and discharge is controlled to bring SOC close to a target value when arriving at a destination and that the target value of SOC is determined based on the drive condition

SUMMARY

It is an object of the present disclosure to provide a control device that is able to appropriately control charge state of an electricity storing part in consideration of influence of air-conditioning.

According to an aspect of the present disclosure, a vehicle is equipped with an internal combustion engine, a motor generator that generates power by being driven by the internal combustion engine, an electricity storing part that outputs or inputs electric power with the motor generator to discharge or charge, and an air-conditioning part that conducts at least one of a heating operation and a cooling operation, and a control device controls a control system for the vehicle.

The control device includes a determining portion, an estimating portion and a changing portion. The determining portion determines whether the vehicle approaches a destination. The estimating portion estimates a cooling demand for the cooling operation or a heating demand for the heating operation in a next trip of the vehicle. The changing portion changes a target value of a charge state of the electricity storing part from a normal value to a different value when the determining portion determines that the vehicle approaches the destination and when the estimating portion estimates that there is the cooling demand or the heating demand.

In case where the cooling operation or the heating operation is conducted immediately after starting a trip of the vehicle, if the charge state of electricity storing part reaches an upper limit or a lower limit, the engine may operate within inefficient state.

According to the present disclosure, the target value of the charge state is changed by considering a change in the charge state that will be caused by heating operation or cooling operation in the next trip, such that the charge state at the timing when arriving at the destination is changed. In other words, the charge state at the timing when starting the next trip is changed. Since the charge state is restricted from reaching the upper limit or the lower limit while performing the heating operation or the cooling operation, the fuel mileage can be improved in the next trip (early stage after the start of the next trip), compared with a case where the target value is not changed.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

Figure 1:
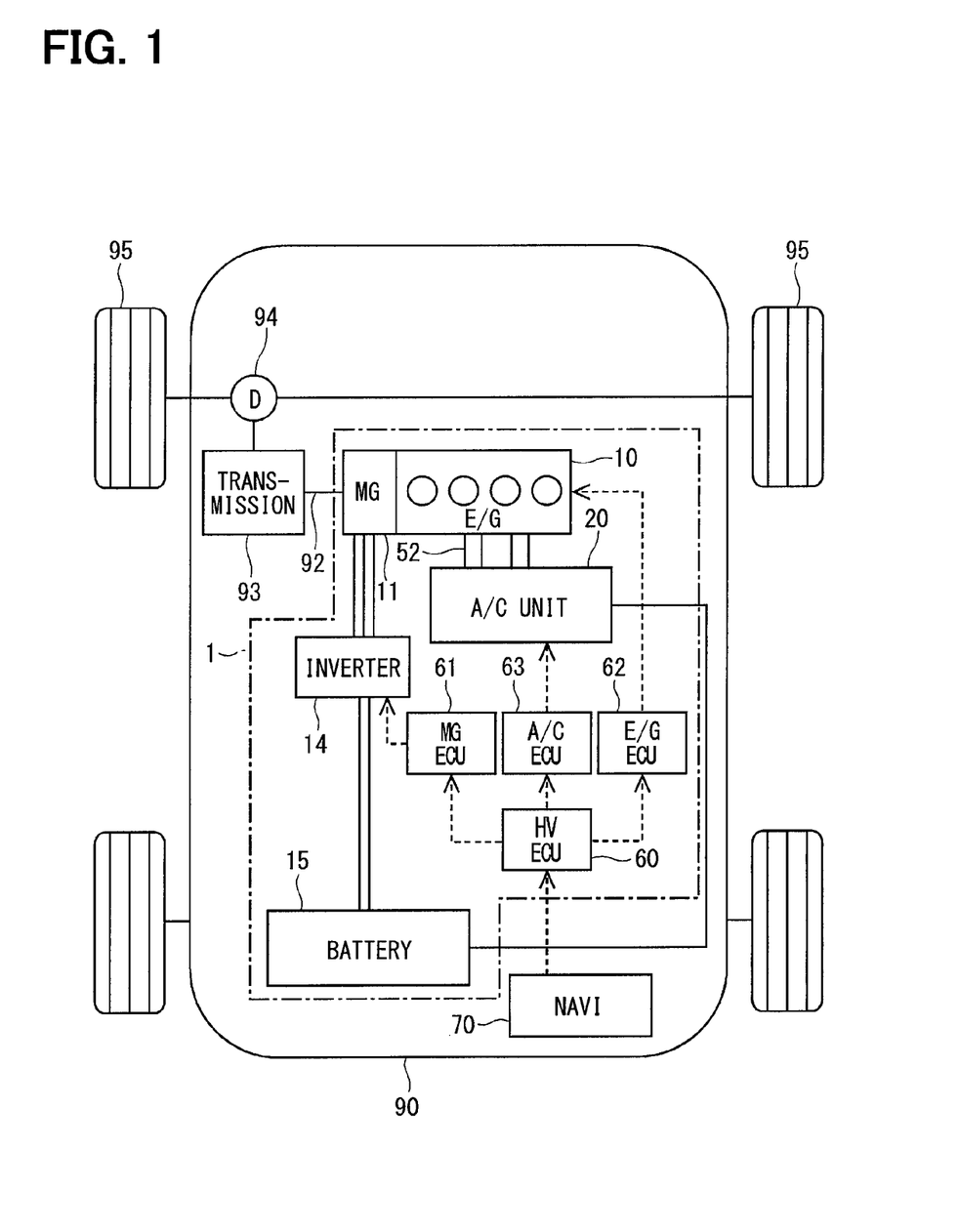
FIG. 1 is a block diagram illustrating a vehicle control system according to an embodiment.

A control device according to an embodiment is explained based on drawings. FIG. 1 illustrates a vehicle control system to which the control device is applied. FIG. 1 is a schematic view, so components necessarily do not correspond to the actual positions in a vehicle 90. The vehicle control system 1 is equipped with an internal combustion engine 10 (E/G), a motor generator 11 (MG), an inverter 14, a battery 15 (electricity storing part), an air-conditioning unit 20 (air-conditioning part), and a hybrid control device 60 (control device).

The engine 10 has plural cylinders, and configures a source of power for the vehicle 90 together with MG 11. MG 11 works as a motor which is driven by electric power supplied from the battery 15 to generate torque, and works as a generator driven by the engine 10 or by braking of the vehicle 90. For example, MG 11 may be a synchronous type three phase alternating current electric motor with permanent magnet.

The vehicle 90 is a hybrid vehicle driven by the engine 10 and MG 11. The driving force is transmitted from the engine 10 and MG 11 to a transmission 93 via a driving shaft 92, and is further transmitted to a driving wheel 95 through a differential gear 94 to rotate the driving wheel 95. The transmission 93 may be a continuously variable transmission.

The inverter 14 is arranged between MG 11 and the battery 15, and converts the DC power of the battery 15 to AC power and supplies the AC power to MG 11. Moreover, the inverter 14 converts AC power generated by MG 11 to DC power and supplies the DC power to the battery 15.

The battery 15 is able to charge and discharge, and may be a rechargeable battery such as nickel hydride or lithium ion, and is controlled so that the charge state (SOC) is within a predetermined range.

The battery 15 outputs electric power to MG 11, and receives electric power from MG 11. Specifically, the AC power generated by MG 11 is converted into DC power by the inverter 14, and is stored in the battery 15. The DC power of the battery 15 is converted into AC power by the inverter 14, and is supplied to MG 11 to drive MG 11.

Figure 2:
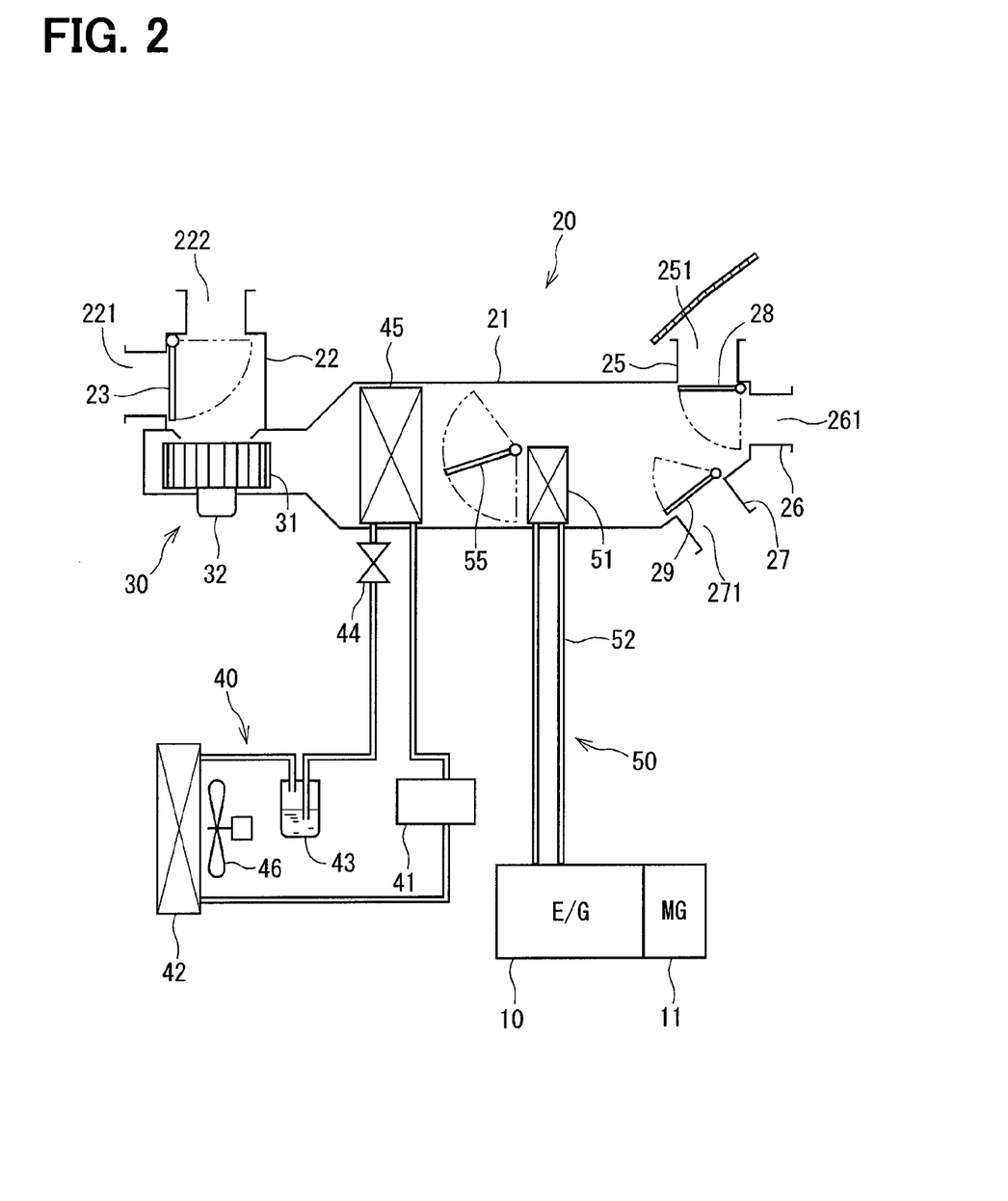
FIG. 2 is a schematic view illustrating an air-conditioning unit in the vehicle control system of the embodiment.

As shown in FIG. 2, the air-conditioning unit 20 includes an air-conditioning duct 21 in which an air passage is defined to introduce conditioned air to the vehicle interior, a fan 30, a refrigerating cycle 40, and a heater unit 50. For example, the air-conditioning unit 20 is arranged ahead of the vehicle interior. In other words, the air-conditioning unit 20 is equipped with the refrigerating cycle 40 which conducts a cooling operation and the heater unit 50 which conducts a heating operation.

The inside/outside air select box 22 is disposed at the most upstream part of the air-conditioning duct 21 in the air flow. The inside/outside air select box 22 has an inside air suction opening 221 and an outside air suction opening 222 which are opened and closed by an inside/outside air select damper 23. The inside/outside air select damper 23 is driven by an actuator (not shown).

A defroster opening, a face opening, and a foot opening are formed at the most downstream part of the air-conditioning duct 21 in the air flow. A defroster duct 25 is connected to the defroster opening. A defroster air outlet 251 is defined at the most downstream end of the defroster duct 25, and blows off conditioned air toward an inner surface of a windshield of the vehicle 90.

A face duct 26 is connected to the face opening. A face air outlet 261 is defined at the most downstream end of the face duct 26, and blows off conditioned air toward an upper half body of an occupant in the vehicle.

A foot duct 27 is connected to the foot opening. A foot air outlet 271 is defined at the most downstream end of the foot duct 27, and blows off conditioned air toward a foot of an occupant in the vehicle.

Air outlet change dampers 28, 29 are rotatably attached to the inner side of the air outlets 251, 261, 271. The air outlet change damper 28, 29 is driven by an actuator (not shown) such as servo motor. The air outlet mode is changed to either a face mode, a bilevel mode, a foot mode, a foot-defroster mode or a defroster mode.

The fan 30 has a centrifugal type blower 31 and a blower motor 32. The centrifugal type blower 31 is rotatably stored in a scroll casing integrally formed with the air-conditioning duct 21. A rotation speed of the blower motor 32 is controlled based on a blower terminal voltage applied through a blower drive circuit (not shown), such that the rotation speed of the centrifugal type blower 31 is controlled to control the amount of air sent from the fan 30.

The refrigerating cycle 40 includes an electric compressor 41, a condenser 42, a gas-liquid separator 43, an expansion valve 44, an evaporator 45, which are connected to each other by a refrigerant piping, and a cooling fan 46.

The electric compressor 41 has a compressor mechanism which compresses refrigerant, and a motor which drives the compressor mechanism. Electric power is supplied from the battery 15 to the motor of the electric compressor 41, and AC voltage is impressed to via an inverter (not shown). The rotation speed of the electric compressor 41 is changed by controlling the frequency by the inverter.

The condenser 42 condenses refrigerant by heat exchange between the compressed refrigerant and outside air. The gas-liquid separator 43 separates the condensed refrigerant between gas and liquid, and makes liquid refrigerant to flow toward the expansion valve 44. The expansion valve 44 decompresses and expands the liquid refrigerant. The evaporator 45 is disposed in the air-conditioning duct 21, and cools air by heat exchange between the air and the refrigerant decompressed and expanded by the expansion valve 44. The cooling fan 46 ventilates outside air to the condenser 42.

The heater unit 50 has a heater core 51, a circulation passage 52, and an electric pump (not shown).

The heater core 51 absorbs heat from the cooling water of the engine 10, and supplies the heat to the vehicle interior as a heating operation. The heater core 51 is disposed downstream of the evaporator 45 in the air-conditioning duct 21 to partially block the air passage.

The engine 10 has a water jacket formed in the cylinder block or cylinder head, and the engine 10 is cooled by circulating the cooling water in the water jacket. The circulation passage 52 is connected to the water jacket, and may be made of a cooling-water piping. The electric pump is arranged in the circulation passage 52, and is driven by electric power to circulate the cooling water.

An air mix damper 55 is rotatably attached between the evaporator 45 and the heater core 51. The air mix damper 55 is driven by an actuator (not shown) such as servo motor, and controls a ratio of the warm air passing through the heater core 51 to the cool air bypassing the heater core 51, such that the temperature of air blown off to the vehicle interior is controlled.

As shown in FIG. 1, the vehicle control system 1 includes the hybrid control device 60, a MG control device 61, an engine control device 62, and an air-conditioner control device 63. The control devices are indicated as ECU in FIG. 1. The control device 60-63 may be a microcomputer with CPU, ROM, RAM, etc., and performs various control processes by executing various control programs memorized in ROM.

Signals are input into the hybrid control device 60 from an accelerator sensor, a shift switch, a brake switch, and a speed sensor (which are not shown), and the hybrid control device 60 controls the whole vehicle 90 based on the signals. The hybrid control device 60 is able to obtain information such as destination from a navigation device 70. The MG control device 61 controls MG 11 based on an instruction output from the hybrid control device 60.

The engine control device 62 controls the engine 10 based on an instruction output from the hybrid control device 60. Specifically, the engine control device 62 carries out a fuel injection control by a fuel injection valve, an ignition timing control by an igniter, a valve timing control by intake-side or/and exhaust-side valve drive mechanism, and an intake amount control by a throttle valve. The air-conditioner control device 63 controls the fan 30 and the electric compressor 41 based on an instruction output from the hybrid control device 60.

The navigation device 70 may be a microcomputer with CPU, ROM, RAM, etc., and displays the position of the vehicle 90 on a map in a display based on the map data and the current position of the vehicle 90 detected by a current position detector (not shown), and searches for a route to the destination.

In this embodiment, a process in which a traveling is started by turning on the ignition power supply and the travelling is ended by turning off the ignition power supply when arriving at the destination is referred as a trip.

In case where a heating operation is performed immediately after starting the trip, since the heat generation by the engine 10 is required, SOC is set relatively low, such that the battery 15 is charged using the excess (surplus) power of the engine 10 excess for generating the power in MG 11.

When a cooling operation is performed immediately after starting the trip, since the load of the electric compressor 41 is high, SOC is set relatively high, such that the electric power of the battery 15 is consumed.

In this embodiment, a heating demand for a heating operation or a cooling demand for a cooling operation in a next trip (a next drive time) is estimated. The heating demand and the cooling demand in combination may be referred to an air-conditioning demand. The target value of SOC at the timing when arriving at the destination in the present trip is changed according to the estimated air-conditioning demand. In this embodiment, the target value of SOC may correspond to a target value of a charge state, and may be referred to a SOC target value.

Figure 3:
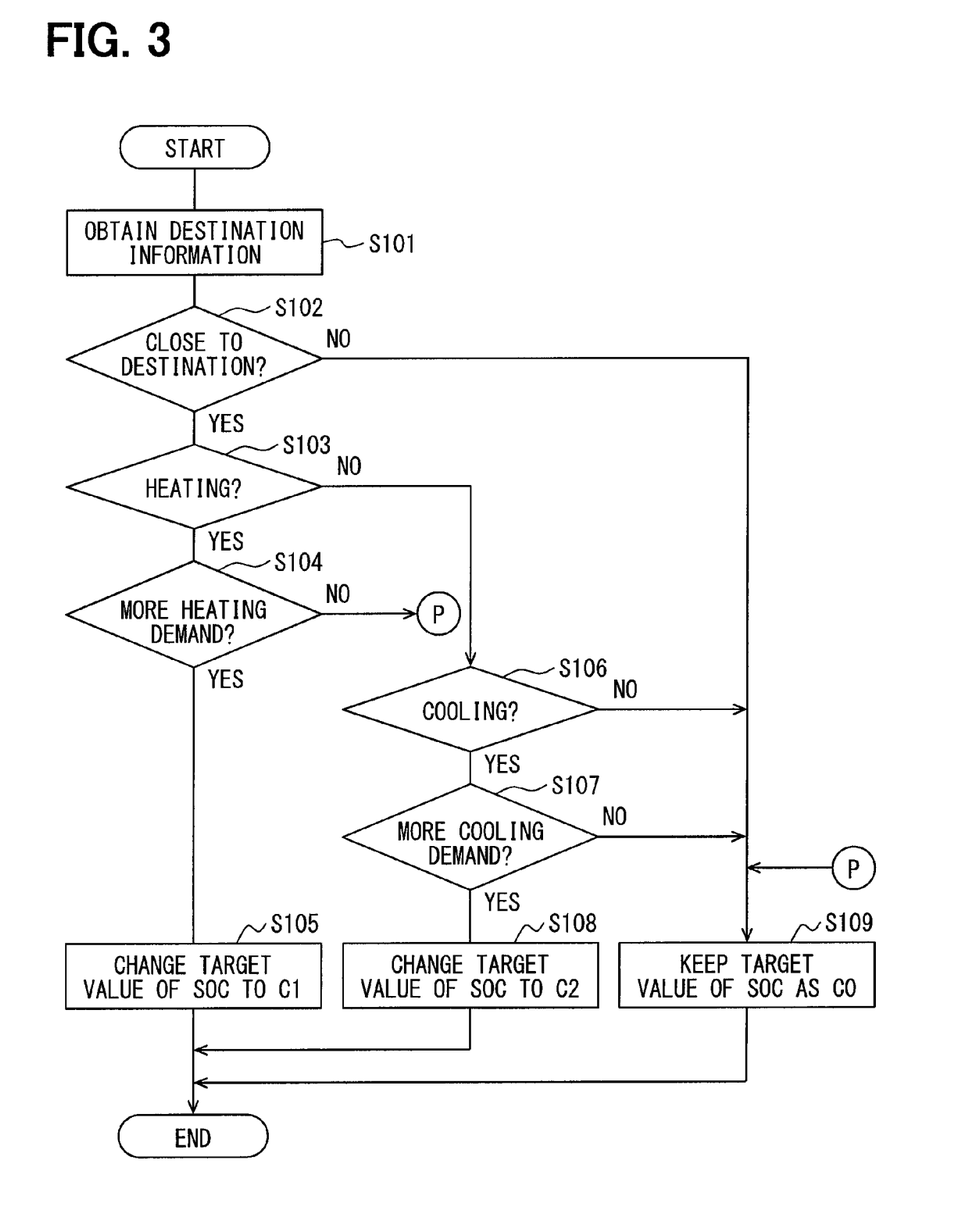
FIG. 3 is a flow chart explaining a SOC control process of the embodiment.

The SOC control process in this embodiment is explained based on the flow chart shown in FIG. 3. The SOC control process is performed with a predetermined interval, for example, when the ignition power supply is turned on.

In S101, a destination information is acquired from the navigation device 70. The destination information includes information of time period taken to arrive at the destination.

In S102, it is determined whether the vehicle approaches the destination or not. Specifically, when the information of time period taken to arrive at the destination acquired in S101 is less than a predetermined time (for example, five minutes), it is determined that the present position is close to the destination. The predetermined time is set according to a time period taken to converge SOC to a heating time target value C1 or a cooling time target value C2 when the SOC target value is changed from a normal target value C0 to the heating time target value C1 or the cooling time target value C2 in S105 or S108 to be mentioned later. The predetermined time is desirably set shorter in a range where it is possible to converge SOC to the heating time target value C1 or the cooling time target value C2.

When it is determined that the present position is not close to the destination (S102: NO), ECU shifts to S109. When it is determined that the present position is close to the destination (S102: YES), ECU shifts to S103.

In S103, it is determined whether a heating operation is performed or not in the present trip. It is determined that a heating operation is performed when a heating operation is being performed (now under execution), or when the heating operation is stopped after the heating operation is executed. When it is determined that heating is not performed in the present trip (S103: NO), ECU shifts to S106. When it is determined that heating is performed in the present trip (S103: YES), ECU shifts to S104.

In S104, it is determined whether a heating demand is large. For example, when outside temperature is lower than or equal to a heating demand determination temperature (for example, 5° C.), it is determined that a heating demand is large. When it is determined that a heating demand is not large (S104: NO), ECU shifts to S109. When it is determined that a heating demand is large (S104: YES), it presumes that there is a heating demand in a next time trip, and shifts to S105.

In S105, the SOC target value is changed into the heating time target value C1. The heating time target value C1 is different from the normal target value C0, and is smaller than the normal target value C0.

When it is determined that heating is not performed in the present trip (S103: NO), ECU shifts to S106 in which it is determined whether cooling is performed. Similarly to S103, it is determined that a cooling operation is performed when a cooling operation is now under execution, or when the cooling operation is stopped after the cooling operation is executed. When it is determined that cooling is not performed in the present trip (S106: NO), ECU shifts to S109. When it is determined that cooling is performed in the present trip (S106: YES), ECU shifts to S107.

In S107, it is determined whether a cooling demand is large. For example, when outside temperature is more than or equal to a cooling demand determination temperature (for example, 30° C.), it is determined that a cooling demand is large. When it is determined that a cooling demand is not large (S107: NO), ECU shifts to S109. When it is determined that a cooling demand is large (S107: YES), it presumes that there is a cooling demand in a next time trip, and shifts to S108.

In S108, the SOC target value is changed to the cooling time target value C2. The cooling time target value C2 is different from the normal target value C0, and is larger than the normal target value C0.

When it is determined that the vehicle is not close to the destination (S102: NO), or when it is presumed that there is no heating demand and no cooling demand (S103: NO and S106: NO, S104: NO, S107: NO), ECU shifts to S109, and the SOC target value is maintained as the normal target value C0.

Figure 4:
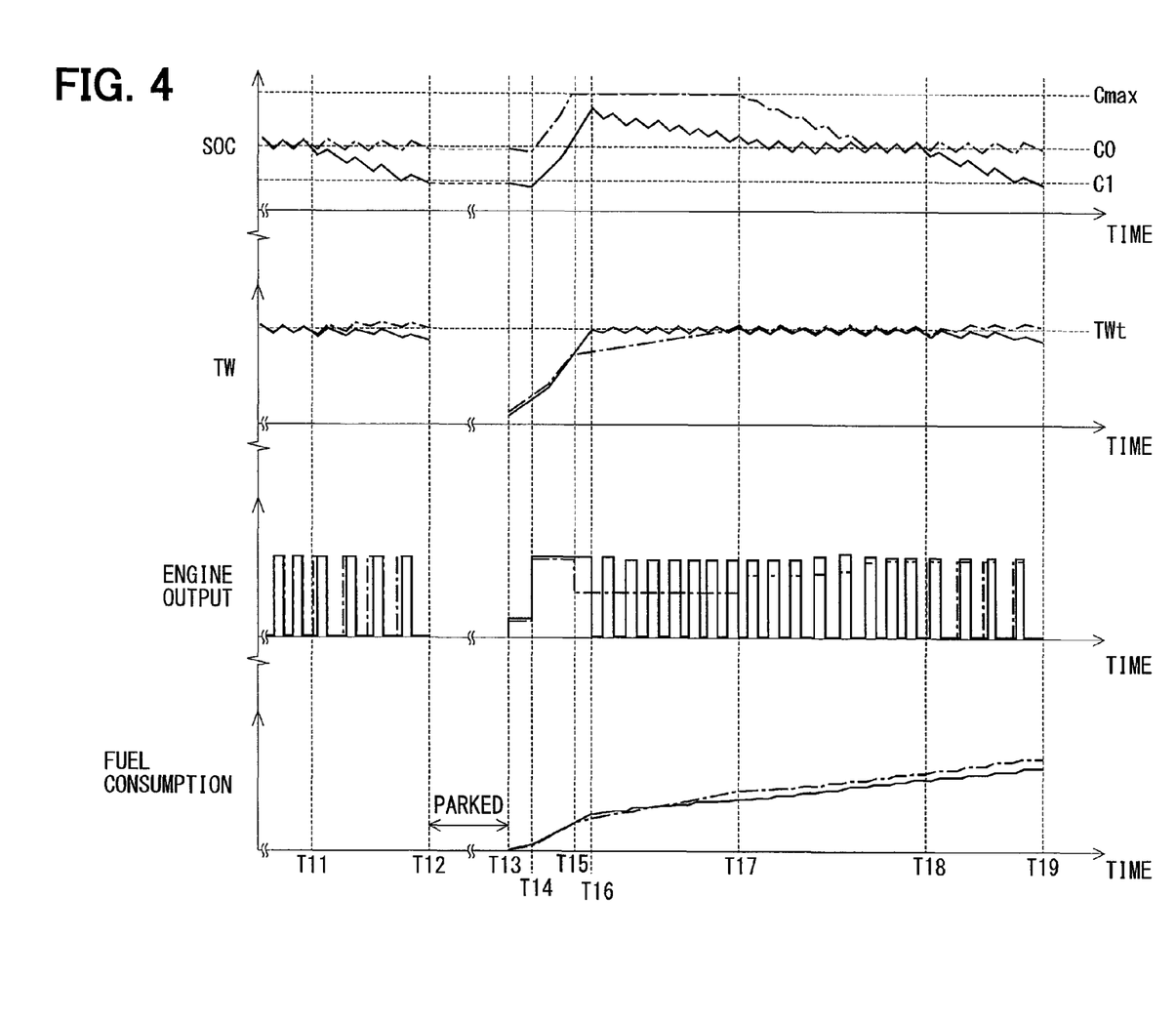
FIG. 4 is a time chart explaining a SOC control process of the embodiment when performing a heating operation.

FIG. 4 illustrates a time chart within a heating operation. In FIG. 4, SOC, the engine water temperature TW, the engine output, and the fuel consumption are shown. The engine water temperature TW in FIG. 4 represents a temperature of cooling water of the engine 10. Fuel consumption in FIG. 4 represents a total fuel consumption in one trip, and is omitted about a trip before the time T12.

In FIG. 4, a single chain line represents a comparison example in which the SOC target value is not changed, and a solid line represents the present embodiment in which the SOC target value is changed in the SOC control process when it is presumed that there is a heating demand in a next time trip.

In a certain trip, SOC is controlled to converge the normal target value C0 in a period after the temperature in the vehicle interior becomes stable (in general after drive for 15 to 20 minutes) up to the time T11.

When it is determined that the vehicle approaches the destination at the time T11 (S101: YES in FIG. 3), and when it is presumed that there is a heating demand in a next time trip (S103: YES and S104: YES), the SOC target value is changed from the normal target value C0 into the heating time target value C1.

In a period from the time T11 where the SOC target value is changed into the heating time target value C1 to the time T12 where the vehicle arrives at the destination, the electric power of the battery 15 is consumed and SOC is lowered, so that SOC approaches the heating time target value C1.

Therefore, compared with the comparison example where the SOC target value is not changed, the engine water temperature TW is lower in the present embodiment, since the drive time without operation of the engine 10 becomes long. However, an occupant in the vehicle is restricted from feeling uncomfortable, since the temperature of the vehicle interior is stable and the time period taken to arrive at the destination is short while the heating performance falls.

After arriving at the destination at the time T12, the next trip is started from the time T13. In the period from the time T12 to the time T13, the vehicle is parked, and the engine water temperature TW falls. For example, in winter, if the next trip is started at the next morning after parked for one evening, the difference between the engine water temperature TW and an after-warmup temperature TWt is large at the time T13 when starting the next trip. The after-warmup temperature TWt is a temperature of the cooling water of the engine after the warmup of the engine is completed.

In a period from the time T13 to the time T14 immediately after the next trip is started, the output of the engine 10 cannot be raised due to the emission requirements, for example, related to warmup of catalyst.

After the time T14, the output of the engine 10 is increased and the engine water temperature TW is raised The engine 10 is operated at the efficient operating point. At this time, surplus output excessing the output for driving the vehicle is used for the power generation in MG 11, and the generated electric power charges the battery 15.

In the comparison example where the SOC target value is not changed from the normal target value C0 in the trip ended at the time T12, as shown in the single chain line in FIG. 4, the SOC reaches the upper limit Cmax at the time T15 before the engine water temperature TW reaches the after-warmup temperature TWt. Therefore, after the time T15, the battery 15 cannot be charged, so the output of the engine 10 is not increased more than the load for the driving. Therefore, the engine 10 is driven at an inefficient operating point. In the period from the time T15 where SOC reaches the upper limit Cmax to the time T17 when the engine water temperature TW reaches the after-warmup temperature TWt, the engine 10 needs to continuously operate in the state where the output is low, and the raising rate in the engine water temperature TW becomes small. Therefore, it takes long time for the engine water temperature TW to reach the after-warmup temperature TWt.

In contrast, in this embodiment, as shown in the solid line, in the trip ended at the time T12, the SOC target value is changed into the heating time target value C1 from the normal target value C0. By starting the next trip with SOC which is lower than usual, SOC does not reach the upper limit Cmax at the time T16 where the engine water temperature TW reaches the after-warmup temperature TWt. Therefore, in the period from the time T14 to the time T16, the engine 10 can continuously operate at the efficient operating point. Compared with the comparison example where a trip is started with the normal target value C0, the engine water temperature TW reaches the after-warmup temperature TWt sooner, and the heating performance can be secured at the earlier stage after starting the trip.

After the engine water temperature TW reaches the after-warmup temperature TWt, the engine 10 has intermittent operation as engine intermittent operation. Specifically, the engine 10 is intermittently driven at the efficient operating point and is suspended according to the load of the engine 10. Moreover, the electric power of the battery 15 is consumed, and SOC is controlled to converge to the normal target value C0. That is, when a trip is started with the heating time target value C1, the engine intermittent operation is performed after the time T16. When a trip is started with the normal target value C0, the engine intermittent operation is performed after the time T17.

As shown in FIG. 4, in the period from the time T15 to the time T16, when a trip is started with the heating time target value C1, the fuel consumption increases compared with the case where a trip is started with the normal target value C0.

In the period from the time T16 to the time T17, when a trip is started with the normal target value C0, since the engine water temperature TW has not reached the after-warmup temperature TWt, the engine 10 cannot be suspended, and the engine 10 needs to continuously operate in an inefficient operating point. In contrast, when a trip is started with the heating time target value C1, since the engine intermittent operation can be performed after the time T16, the fuel consumption can be reduced. Therefore, as the whole trip, the fuel consumption can be reduced by starting a trip with the heating time target value C1 that is smaller than the normal target value C0.

It is assumed that the temperature of the vehicle interior is in stable state by the time T18. Similarly to the time T11, when it is determined that the present position is close to the destination at the time T18 (S101: YES), and when it is presumed that there is a heating demand in a next time trip (S103: YES and S104: YES), the SOC target value is changed from the normal target value C0 to the heating time target value C1. In the period ended at the time T19 where the vehicle arrives at the destination, electric power is consumed and SOC is reduced. Accordingly, compared with a case where SOC is not changed, the fuel consumption in a next time trip can be reduced.

Figure 5:
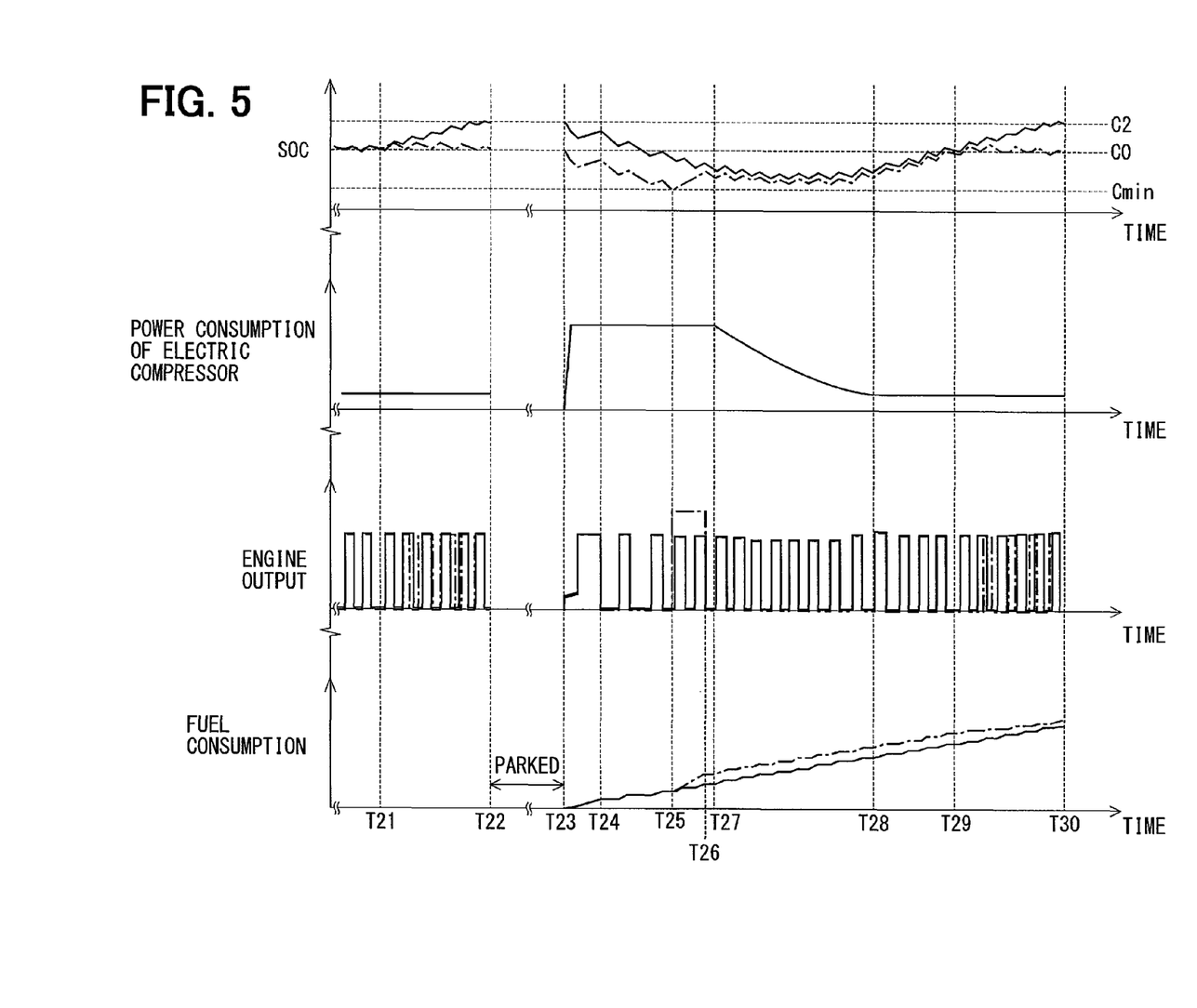
FIG. 5 is a time chart explaining a SOC control process of the embodiment when performing a cooling operation.

FIG. 5 illustrates a time chart within a cooling operation. In FIG. 5, SOC, the power consumption of the electric compressor 41, the engine output, and the fuel consumption are shown. Fuel consumption in FIG. 5 represents a total fuel consumption in one trip, and is omitted about a trip before the time T22.

In FIG. 5, a single chain line represents a comparison example in which the SOC target value is not changed, and a solid line represents the present embodiment in which the SOC target value is changed in the SOC control process when it is presumed that there is a cooling demand in a next time trip. The power consumption of the electric compressor 41 is same between the comparison example and the present embodiment, so only the solid line is shown in the power consumption of the electric compressor 41 in FIG. 5.

In a certain trip, SOC is controlled to converge to the normal target value C0 in a period after the temperature of the vehicle interior becomes stable (in general after drive for 15 to 20 minutes) up to the time T21.

When it is determined that the vehicle approaches the destination at the time T21 (S101: YES in FIG. 3), and when it is presumed that there is a cooling demand in a next time trip (S106: YES, S107: YES), the SOC target value is changed from the normal target value C0 into the cooling time target value C2.

In the period from the time T21 where the SOC target value is changed to the cooling time target value C2 to the time T22 where the vehicle arrives at the destination, power generation is positively performed to increase SOC, compared with the comparison example where the SOC target value is not changed from the normal target value C0.

After arriving at the destination at the time T22, the vehicle is parked for several hours in an outdoor parking lot in daytime of summer, and the next trip is started from the time T23. At the time T24, the engine water temperature TW reaches the after-warmup temperature TWt, and the warmup of the engine is completed. After the time T24 when the engine water temperature TW reaches the after-warmup temperature TWt, the engine intermittent operation is performed.

In case where a cooling operation is performed from the time T23 when the trip is started, the electric compressor 41 is driven from the time T23. If the temperature of the vehicle interior is high immediately after the trip start, SOC falls, since the electric compressor 41 is driven by approximately full power using the electric power of the battery 15.

In the comparison example where the SOC target value is not changed from the normal target value C0 in the trip ended at the time T22, as shown in the single chain line in FIG. 5, SOC reaches the lower limit Cmin at the time T25. If SOC reaches the lower limit Cmin, a compulsive charge control is performed to recover the charge amount of the battery 15. In the period from the time T25 the time T26 where the compulsive charge control is performed, the fuel consumption increases, since the engine 10 is operated to produce high output at an inefficient operating point.

In contrast, in this embodiment, as shown in the solid line in FIG. 5, in the trip ended at the time T22, the SOC target value is changed into the cooling time target value C2 from the normal target value C0. By starting the next trip with SOC which is higher than usual, SOC is restricted from reaching the lower limit Cmin. The compulsive charge control is not performed since SOC does not reach the lower limit Cmin. Therefore, the fuel consumption can be restricted from increasing by the compulsive charge control. Therefore, as shown in FIG. 5, the fuel consumption can be reduced by starting a trip with the higher SOC in the present embodiment, compared with the comparison example.

If the temperature in the vehicle interior falls gradually, the consumption power of the electric compressor 41 will decrease gradually after the time T27. When the vehicle interior is fully cooled at the time T28, the consumption power of the electric compressor 41 is set to a fixed value. Then, SOC is controlled to converge to the normal target value C0.

It is assumed that the temperature of the vehicle interior is a stable state by the time T29. Similarly to the time T21, when it is determined that the present position is close to the destination at the time T29 (S101: YES), and when it is presumed that there is a cooling demand in a next time trip (S106: YES, S107: YES), the SOC target value is changed from the normal target value C0 to the cooling time target value C2. In the period from the time T29 to the time T30 where the vehicle arrives at the destination, power generation is positively performed and SOC is raised. Accordingly, compared with the comparison example where SOC is not changed, the fuel consumption in a next time trip can be reduced.

According to the embodiment, the vehicle control system 1 is equipped with the engine 10 which is a source of power, MG 11, the battery 15, and the air-conditioning unit 20. MG 11 generates power by being driven by the engine 10. The battery 15 outputs and receives electric power relative to MG 11 to charge and discharge. The air-conditioning unit 20 performs at least one of a heating operation and a cooling operation.

The hybrid control device 60 controls the vehicle control system 1, and performs the following processes.

The hybrid control device 60 determines whether the vehicle 90 approaches the destination (S102 in FIG. 3). Moreover, the hybrid control device 60 presumes the existence of heating demand for a heating operation or cooling demand for a cooling operation in the next trip (S103, S104, S106, S107).

The hybrid control device 60 changes the SOC target value related to the charge of the battery 15 to a different value different from the normal target value C0, when it is determined that the vehicle 90 approaches the destination (S102: YES), and when it is presumed that there is a heating demand or a cooling demand (S103: YES and S104: YES, or S106: YES and S107: YES).

By using the air conditioner immediately after starting a trip, if SOC of the battery 15 reaches the upper limit Cmax or the lower limit Cmin, the engine 10 may be forced to operate at an inefficient operating point.

According to this embodiment, the SOC target value is changed in consideration of future change in SOC caused by using the air conditioner in a next time trip. Therefore, SOC at the timing when arriving at the destination is changed. In other words, SOC at the timing when starting a next trip is changed. Accordingly, compared with the case where a SOC target value is not changed, SOC is restricted from reaching the upper limit Cmax or the lower limit Cmin while using the air conditioner, so the fuel mileage can be improved in a next trip (especially early stage in the next trip).

In detail, when it is presumed that there is a heating demand in the next trip (S103: YES and S104: YES), the hybrid control device 60 changes the SOC target value to the heating time target value C1 which is a value smaller than the normal target value C0.

When a heating operation is conducted at early stage after starting a trip, the output of the engine 10 is increased in order to raise the engine water temperature TW, and the electric power generated by MG 11 with excessive output charges the battery 15, so there is tendency that SOC increases. According to the embodiment considering the rise in SOC caused by a heating operation in a next trip, when it is presumed that there is a heating demand, the SOC target value is changed to a value smaller than the normal target value C0, such that SOC is lowered when arriving at the destination. Thus, a next trip is started with the lowered SOC.

Since SOC is restricted from reaching the upper limit Cmax before the engine water temperature TW reaches the after-warmup temperature TWt, the engine 10 can be continuously operated at an efficient operating point, and the fuel mileage can be improved compared with the case where a SOC target value is not changed. Moreover, since the rise in the engine water temperature TW is brought forward, heating performance is securable at the early stage.

When it is presumed that there is a cooling demand in a next trip (S106: YES and S107: YES), the hybrid control device 60 changes the SOC target value to the cooling time target value C2 which is a value larger than the normal target value C0.

When a cooling operation is performed at early stage after starting a trip, the electric compressor 41 is driven with the electric power of the battery 15, so there is tendency that SOC decreases. According to the present embodiment, when it is presumed that there is a cooling demand, in consideration of the fall in SOC caused by a cooling operation in a next trip, the SOC target value is changed to a value larger than the normal target value C0, such that SOC is raised when arriving at the destination. Thus, a next trip is started with the raised SOC. Accordingly, SOC is restricted from reaching the lower limit Cmin, and the compulsive charge control is restricted. The fuel mileage can be improved as compared with the case where a SOC target value is not changed.

The hybrid control device 60 presumes the existence of a heating demand or a cooling demand based on the operation history of the air-conditioning unit 20 (S103, S106). Moreover, the hybrid control device 60 presumes the existence of a heating demand or an cooling demand based on outside air temperature (S104, S107). Thereby, the existence of the heating demand and cooling demand in a next time trip can be estimated appropriately.

The hybrid control device 60 acquires information concerning the destination from the navigation device 70 (S101), and determines whether the vehicle 90 approaches the destination based on the destination information. By using the information obtained from the navigation device 70, time taken to arrive at the destination and operational status can be appropriately predicted. Therefore, SOC at the timing arriving at the destination can be suitably controlled to be a target SOC.

The hybrid control device 60 correspond to a determining portion, an estimating portion, a changing portion, and an acquisition portion in this embodiment. Specifically, S102 in FIG. 3 corresponds to the determining portion. S103, S104, S106, and S107 correspond to the estimating portion. S105 and S108 correspond to the changing portion. S101 corresponds to the acquisition portion.

As to the determining portion, it is determined that the present position is close to the destination when the time period taken to arrive at the destination is less than a predetermined time, and the information is acquired from the navigation device in the above-mentioned embodiment. In other embodiment, information concerning the distance from the present location of vehicle to the destination may be obtained from the navigation device, and the determining portion may determine that the present position is close to the destination when the distance to the destination becomes smaller than or equal to a predetermined distance. Moreover, the determination may be performed based on a variety of information other than the destination information, such as traffic congestion information, acquired from other system other than the navigation device.

Alternatively, the determining portion may determine that the present position is close to the destination when a time period elapsed from a trip start is longer than or equal to a predetermined time. The predetermined time is set based on time period taken for making the temperature in the vehicle interior stable, and may be set differently between a case of heating demand and a case of cooling demand. When the time period elapsed from a trip start is longer than or equal to the predetermined time and when the air conditioning is in a stable state, it is interpreted that the present position is close to the destination, since there is little influence on the fuel consumption by changing the SOC target value. Then, the SOC target value is changed to prepare for a next trip. Thereby, for example, even if information cannot be obtained from the navigation device, the SOC target value can be set appropriately according to the presumed air-conditioning demand.

A trip start corresponds to a drive start. In the above-mentioned embodiment, when the ignition power supply is turned on, the trip start is specified. Alternatively, the trip start may be specified when the vehicle is ready for driving. Moreover, the determination portion may determine whether the temperature in the vehicle interior is stable. When the temperature of the vehicle interior is in a stable state, it may be determined that the present position is close to the destination, and the SOC target value may be changed according to the air-conditioning demand in a next trip.

The determining portion may determine whether the vehicle approaches the destination based on the past run history of the vehicle. For example, when the vehicle drives along a course along which the vehicle had driven in the past, the end point of the past trip is set as a destination. It is determined whether the vehicle approaches the destination based on the distance to the destination or the time taken for arriving at the destination.

For example, it may be determined that the present position is close to the destination when a difference between the mileage of the present trip and the history mileage becomes smaller than or equal to a predetermined value, based on the history mileage (such as frequency distribution, average value, etc.) which is mileage of one trip in the past drive.

Alternatively, it may be determined that the present position is close to the destination when a difference between the drive time of the present trip and the history of the drive time becomes smaller than or equal to a predetermined value, based on the history of the drive time (such as frequency distribution, average value, etc.) which is drive time of one trip in the past drive.

Accordingly, if the destination is not set in the navigation device, or if the information cannot be obtained from the navigation device, the SOC target value can be set appropriately according to the presumed air-conditioning demand.

As to the estimating portion, it is determined that a cooling demand is large in S107 when outside air temperature is more than or equal to a determined value in the above-mentioned embodiment. In other embodiment, when a solar amount is larger than or equal to a predetermined value (for example, 500 W/m$^2$), it is determined that a cooling demand is large. Moreover, when outside air temperature is more than or equal to a predetermined temperature (for example, 25° C.) and when humidity is more than or equal to a predetermined humidity (for example, 60%), it may be determined that a cooling demand is large.

The outside temperature, the solar amount, and the humidity which are used for estimating the air-conditioning demand may be based on the data at the timing of the determination, or may be based on the history data in the present trip. The outside air temperature may be replaced with the temperature of air inside the vehicle.

Moreover, the existence of the air-conditioning demand in a next time trip may be estimated based on change history in the air-conditioning preset temperature by a user and/or change history in the target outlet air temperature (TAO). The concept of the operation history in the air-conditioning part includes the change history in the air-conditioning preset temperature and the change history in TAO.

In the above-mentioned embodiment, it is presumed that there is a heating demand in a next trip, when the heating is performed in the present trip and when the heating demand is large. In other embodiment, it is presumed that there is a heating demand in a next trip, when the heating is performed in the present trip or when the heating demand is large. Moreover, in S103, an affirmative judgment may be performed when a heating operation is under execution, and a negative judgment may be performed when a heating operation is not under execution.

In the above-mentioned embodiment, it is presumed there is a cooling demand in a next trip, when the cooling is performed in the present trip and when the cooling demand is large. In other embodiment, it is presumed there is a cooling demand in a next trip, when the cooling is performed in the present trip or when the cooling demand is large. Moreover, in S106, an affirmative judgment may be performed when a cooling operation is under execution, and a negative judgment may be performed when a cooling operation is not under execution.

The estimating portion may estimate either a heating demand or a cooling demand as the air-conditioning demand. That is, a part of S103, S104, S106, and S107 may be omitted. The order for executing the determination processes of S102, S103, S104, S106, and S107 may be changed.

As to the changing portion, in the above-mentioned embodiment, the SOC target value is set to the heating time target value C1 when it is presumed that there is a heating demand in a next time trip, and the SOC target value is set to the cooling time target value C2 when it is presumed that there is a cooling demand. In other embodiment, either one of the change in the SOC target value at the heating demand time and the change in the SOC target value at the cooling demand time may be omitted.

In other embodiment, the changing portion may variably change the heating time target value C1 according to the degree of heating demand without being restricted to a fixed value. For example, as the outside air temperature is lower, the heating time target value C1 is set smaller.

Similarly, the changing portion may variably change the cooling time target value C2 according to the degree of cooling demand. For example, as the outside air temperature is higher, the cooling time target value C2 is set larger.

In the above-mentioned embodiment, the normal target value, the heating time target value, and the cooling time target value are predetermined fixed values. In other embodiment, at least one of the normal target value, the heating time target value, and the cooling time target value may be a value within a predetermined range. That is, the concept of the normal target value, the heating time target value, and the cooling time target value includes not only a predetermined value but a value within a predetermined range.

As to the air-conditioning unit, in the above-mentioned embodiment, the air-conditioning part is an air-conditioning unit having the heater unit for heating operation and the refrigerating cycle for cooling operation. In other embodiment, one of the heater unit and the refrigerating cycle may be omitted. A structure for cooling is not limited to the refrigerating cycle. A structure for heating is not limited to the heater unit, and may be a heat pump system or an electric heater. When using electric power with the structure concerning the heating operation, such as heat pump system or electric heater, the heating time target value may be suitably set according to the electric power used, and may be set as a value larger than the normal target value.

As to the control device, in the above-mentioned embodiment, the vehicle control system is equipped with the hybrid control device, the MG control device, the engine control device, and the air-conditioner control device. In other embodiment, the vehicle control system may further include a power control device for monitoring the charge state of battery. Moreover, a part or all of the control devices may be configured by one control device.

In the above-mentioned embodiment, the determining portion, the estimating portion, the changing portion, and the acquisition portion are configured by the hybrid control device. A part or all of the above-mentioned portions may be configured by other control device other than the hybrid control device.

As to the vehicle control system, in the above-mentioned embodiment, one motor generator is arranged in the vehicle. In other embodiment, the number of MG may be not only one but two or more. The motor generator is not limited to the synchronous type three phase alternating current electric motor with a permanent magnet. The electricity storing part is not limited to the rechargeable battery, and may be other element such as electric double layer capacitor, which can charge and discharge by receiving and giving electric power with the motor generator.

Such changes and modifications are to be understood as being within the scope of the present disclosure as defined by the appended claims.

What is claimed is:

1. A control device for a vehicle equipped with an internal combustion engine, a motor generator that generates power by being driven by the internal combustion engine, an electricity storing part that outputs or inputs electric power with the motor generator to discharge or charge, and an air-conditioning part that conducts at least one of a heating operation and a cooling operation, wherein the control device comprising:
   a determining portion that determines whether the vehicle approaches a destination;
   an estimating portion that estimates a cooling demand for the cooling operation or a heating demand for the heating operation in a next trip of the vehicle; and
   a changing portion that changes a target value of a charge state of the electricity storing part from a normal value to a different value when the determining portion determines that the vehicle approaches the destination and when the estimating portion estimates that there is the cooling demand or the heating demand.

2. The control device according to claim 1, wherein
the changing portion changes the target value from the normal value to the different value that is smaller than the normal value when the estimating portion estimates that there is the heating demand.

3. The control device according to claim 1, wherein
the changing portion changes the target value from the normal value to the different value that is larger than the normal value when the estimating portion estimates that there is the cooling demand.

4. The control device according to claim 1, wherein
the estimating portion estimates the heating demand or the cooling demand based on an operation history of the air-conditioning part.

5. The control device according to claim 1, wherein
the estimating portion estimates the heating demand or the cooling demand based on a temperature of air outside of the vehicle.

6. The control device according to claim 1, further comprising:
   an acquisition portion that acquires information of the destination from a navigation device, wherein
   the determining portion determines whether the vehicle approaches the destination based on the information of the destination.

7. The control device according to claim 1, wherein
the determining portion determines that the vehicle approaches the destination when an elapsed time period elapsed from a trip start of the vehicle is longer than or equal to a predetermined time period.

8. The control device according to claim 1, wherein
the determining portion determines whether the vehicle approaches the destination based on a past drive history of the vehicle.

* * * * *